United States Patent
Lee et al.

(10) Patent No.: US 7,849,024 B2
(45) Date of Patent: Dec. 7, 2010

(54) IMAGING SYSTEM FOR PRODUCING RECIPES USING AN INTEGRATED HUMAN-COMPUTER INTERFACE (HCI) FOR IMAGE RECOGNITION, AND LEARNING ALGORITHMS

(75) Inventors: Shih-Jong J. Lee, Bellevue, WA (US); Samuel V. Alworth, Seattle, WA (US); Tuan Phan, Lynnwood, WA (US); Chi Chou Huang, Redmond, WA (US); Christopher Birnbaum, Bellevue, WA (US)

(73) Assignee: DRVision Technologies LLC, Bellevue, WA (US)

( * ) Notice: Subject to any disclaimer, the term of this patent is extended or adjusted under 35 U.S.C. 154(b) by 1091 days.

(21) Appl. No.: 11/506,081

(22) Filed: Aug. 16, 2006

(65) Prior Publication Data

US 2008/0044084 A1  Feb. 21, 2008

(51) Int. Cl.
 *G06F 15/18* (2006.01)
(52) U.S. Cl. .................... 706/12; 382/155
(58) Field of Classification Search ............ 706/12, 706/15–16, 45–47, 62; 382/181, 155–161, 382/190–231
See application file for complete search history.

(56) References Cited

U.S. PATENT DOCUMENTS

| 6,507,675 | B1 | 1/2003 | Lee et al. | |
| 6,941,288 | B2 | 9/2005 | Lee et al. | |
| 2004/0057618 | A1* | 3/2004 | Magee et al. | 382/173 |
| 2004/0202368 | A1 | 10/2004 | Lee et al. | |
| 2004/0267770 | A1 | 12/2004 | Lee | |
| 2007/0114224 | A1* | 5/2007 | Nagamitsu et al. | 219/490 |
| 2008/0017796 | A1* | 1/2008 | Zewail et al. | 250/307 |
| 2008/0124314 | A1* | 5/2008 | Giordano | 424/94.2 |
| 2008/0221848 | A1* | 9/2008 | Pickford et al. | 703/11 |
| 2008/0254004 | A1* | 10/2008 | Terskikh et al. | 424/93.7 |

OTHER PUBLICATIONS

Slidebook 4.0, 2002, Intelligent Imaging Innovations.*
Liu et al., A quantitative evalutation of peroxidase inhibitors for tyraminde signal amplification mediated cytochemistry and hemtochemistry, Feb. 2006, pp. 1-9, Histochem Cell Biol.*
U.S. Appl. No. 11/301,292, filed Dec. 7, 2005, Lee et al.
Andrews P.D., Harper I.S., Swedlow J.R. "To 5D and beyond: quantitative fluorescence microscopy in the postgenomic era", Traffic, Jan;2(1):29-36, 2002.
Compix Imaging Inc. "Simple PCI: quick start guide", online at: http://www.cimaging.net/support/how_tos/, 2004.

(Continued)

Primary Examiner—David R Vincent

(57) ABSTRACT

A Recognition Frame presents multi-level application elements to the user simultaneously through a computer graphical user interface. The interface consists of an image display panel for displaying image channels; a data display panel for displaying object measurements and summary statistics; a configuration display panel for displaying recipe content; a master tab for selecting the panels. It also consists of a processing toolbar for context dependent processing tool display. The Recognition Frame further comprises a second side frame for data object display and charting. The second side frame has a tabular arrangement consisting of properties tab, controls tab, and charts tab. The Recognition Frame links application elements through a complex data model wherein interface display is automatically updated when one element is changed.

20 Claims, 9 Drawing Sheets

OTHER PUBLICATIONS

Compix Imaging Inc. "Simple PCI visualization multi-dimensional: quick start guide", online at: http://www.cimaging.net/support/how_tos/, 2004.

Compix Imaging Inc. "Simple PCI dynamic intensity analysis: quick start guide", online at: http://www.cimaging.net/support/how_tos/, 2004.

Compix Imaging Inc. "Simple PCI image processing and analysis: quick start guide", online at: http://www.cimaging.net/support/how_tos/, 2004.

GE Healthcare Limited, "In Cell Investigator high-content analysis software v1.0. Flexible software for automated analysis of high-content cellular images", 2006.

Intelligent Imaging Innovations, Inc. "Slidebook 4.0 Brochure", available online at: www.intelligent-imaging.com, 2002.

Molecular Devices Corporation, "MetaXpress application modules: Turn key high-content image processing software", online at: www.moleculardevices.com, 2006.

Reindeer Graphics Inc., "IPTK 5.0", online at: www.reindeergraphics.com, 2005.

Rienking, L., "ImageJ overview", online at: http://rsb.info.nih.gov/ij/docs/pdfs/ImageJ.pdf, 2001.

Swedlow J.R., Macura T., "OME getting started / tutorial", online at: http://www.openmicroscopy.org/getting-started/shoola.html, 2006.

* cited by examiner

IMAGING SYSTEM FOR PRODUCING RECIPES USING AN INTEGRATED HUMAN-COMPUTER INTERFACE (HCI) FOR IMAGE RECOGNITION, AND LEARNING ALGORITHMS

TECHNICAL FIELD

This invention relates to the presentation of multi-level image recognition application elements to the user simultaneously through a computer graphical user interface.

BACKGROUND OF THE INVENTION

Significant advancements in imaging sensors, microscopes, digital cameras, and digital imaging devices coupled with fast CPUs, high speed network connections and large storage devices enable broad new applications in the field of image recognition. The image recognition field includes a huge and broad range of practical activities including military and defense, biomedical engineering systems, material sciences, drug discovery, medical diagnostics, health monitoring, surgery, intelligent transportation systems, electronics manufacturing, robotics, entertainment and security systems. Image recognition applications entail the preprocessing and enhancement of images, definition of objects in images (image segmentation), calculation of whole image and object measurements, derived measurements and measurement statistics, data visualization, analysis, modeling and knowledge discovery from the measurements and statistics, and the classification of object subsets and/or the creation of image based decision analytics such as automated defect inspection systems, disease diagnosis systems, and pharmaceutical assay systems in early drug discovery. The robust encoding of processing rules and procedures into application recipes for high volume execution can be facilitated by machine learning technologies (Lee S J, Oh S, Huang C, 2003. Structure-guided automatic learning for image feature enhancement. U.S. Pat. No. 6,507,675; Jan. 14; Lee S J, Owsley L, Oh S, 2005. Online learning method in a decision system. U.S. Pat. No. 6,941,288; September 6; Lee S J, Oh S, 2004. Learnable object segmentation. United States Patent Application No. 20040202368; Oct. 14; Lee S J 2004. Dynamic learning and knowledge representation for data mining. United States Patent Application No. 20040267770; Dec. 30; Lee S J, Oh S, 2005. Method of directed pattern enhancement for flexible recognition. U.S. patent application Ser. No. 11/301,292; filed Dec. 7) at many points in the application workflow.

Image recognition applications involve the creation, manipulation, interaction, and viewing of different levels of data elements such as multi-dimensional images, image and application metadata, object masks, object regions of interest (ROIs), measurement data, summary statistics, object class and group designation, and processing recipes. The handling of these complex elements is compounded by the increasing dimensionality of imaging applications. For example, image recognition applications in advanced microscopy imaging are often termed "six dimensional" (x, y, t, z, channel and position) (Andrews P D, Harper I S, Swedlow J R. 2002. To 5D and beyond: quantitative fluorescence microscopy in the postgenomic era. Traffic. Jan;3(1):29-36.)

To deal with the complexity, expert users use multiple software for various tasks in their image recognition application (e.g. one software for image segmentation and measurement, and a different software for data analysis). Others purchase application specific turnkey solutions from original equipment manufacturers, or tailored solutions from system configuration providers or value added resellers, which are limited to the specific applications that the solutions are designed for. The lack of generic, easy-to-use software for managing the complexity of image recognition applications has prohibited the widespread adoption of image recognition software by end users.

A generic human-computer interface that can efficiently and transparently manage image recognition application complexity through a single interface would enhance the ease-of-use of image recognition software and reduce the cost of adoption and deployment by ordinary (non expert) users. This will allow the widespread use of image recognition technology in broad applications.

Prior art solutions range from simple image processing toolboxes to turnkey, application specific, high throughput image recognition solutions. No product provides a generic, all in one image recognition graphical interface that simultaneously presents the multi-level application elements, alongside application state-dependent processing choices.

At the most basic, image processing toolboxes such as Reindeer Graphic's Image Processing Toolkit and ImageJ, a public domain image processing software provided by Wayne Rasband of the National Institutes of Health, provide functions for image enhancement, image segmentation and mask measurements and can be considered image recognition software. With these and similar tools, images, masks and measurements are all treated individually. No relationships are maintained between these application elements. They all appear in their own, distinct, graphical windows.

Good examples of more sophisticated, easy-to-use and general purpose microscopy image recognition software include Intelligent Imaging Innovation's Slidebook and Compix's SimplePCI. Slidebook has a Slide interface that allows for an intuitive presentation of multi-dimensional images, and image derived object masks are maintained and presented alongside the multi-dimensional images in the graphical user interface (GUI). However, object measurements are treated as separate, unrelated elements, which are presented in separate windows and do not persist with the slide. They can only be saved to file. SimplePCI has an interface called the Data Document. It enables the presentation of some image recognition application elements along with processing tools. However, there are still several important drawbacks to this interface with make it difficult to use and non-ideal. Images are treated differently from the Data Document and have to be imported into the Data Document before the image recognition application can be completed. Basic image analysis tasks can be done on the image prior to import, while additional image recognition tasks can only be done in the Data Document. Second, the interface relies on a hierarchical folder structure which hides elements of the application from view. To navigate to various application elements or views of application elements users have to click through multiple levels of this hierarchy. It is desirable to present all application elements to the user simultaneously so that they can be accessed through a single click.

In addition, with the exception of SimplePCI, many of these general purpose image recognition software interfaces lack the capability to deal with large numbers of images and associated data. It is desirable to allow for the users to easily review image recognition elements for a large number of application elements, with all elements available in a single interface for easy and intuitive workflow.

The next type of prior art solution is tailored for high volume imaging applications. These include the Open Microscopy Environment's (OME) Shoola and Molecular Devices' MetaXpress. While these software enable high volume image and data handling and analysis, their interfaces are more task specific not generic for broad image recognition applications.

OME is a database driven, open source, open platform academic-industrial collaboration with the goal of creating standards for multi-dimensional microscopy image recognition database I/O and inter-application image and data exchange in support of high volume quantitative microscopy. In addition to developing the database backend and middle tiers, OME has also developed a web based image recognition GUI called "Shoola". Shoola is a sophisticated GUI that covers the full breadth of image recognition applications in advanced microscopy research. However, Shoola provides too many element specific interfaces, making it difficult for novice users. Images are presented in the Image Viewer window, object data is presented in the ROI Analysis window, and object sets and subsets (classes) are presented in an image montage in the Hierarchy Browser. Furthermore, OME is paradoxically very general purpose but specific to imaging microscopy. This means that users have to configure their database, and set up database queries to drive the Shoola interface for their applications, but given the application logic inherent in both the database schema and the Shoola interface, the setup may not be useful for image recognition applications outside the specific field within quantitative microscopy. It is desirable to have an image recognition software and interface that is generic for all image recognition applications, require no database programming knowledge to populate, present all application elements in a single interface, even for high volume applications, in support of easy-to-use and intuitive workflow.

Molecular Devices' MetaXpress is an image recognition software for screening applications in early drug discovery. Similar to Shoola it provides support for high volume imaging and application element review. Unlike Shoola, it is a turnkey system providing application interfaces specific to drug screening applications (for example, images and data are arranged in well plate configuration) and requires no database configuration, though some database querying is required to populate the interfaces. The MetaXpress interface is non-ideal in many aspects. It requires some database query setup, and its GUIs are not relevant beyond drug screening applications. Application elements are not presented through a single graphical interface. The application elements cannot be freely modified, as access is driven by the application specific logic. The application specific logic drives the workflow through a series of wizards and GUIs that are specific to particular application elements. The user experience is non-intuitive and tiresome.

OBJECTS AND ADVANTAGES

This invention provides a generic and easy-to-use human computer interface, called a Recognition Frame for the creation, management, processing, modification and visualization of image recognition application elements. It brings image recognition applications to a new level of efficiency and convenience, and could significantly alleviate bottlenecks in scientific research and product development.

The invention provides multi-level application element presentation with context dependent processing options co-located in a single human-computer interface frame. The generic image and data presentation can be easily modified by users into a configuration better tailored to their specific application. The invention provides multi-level application element access and visualization within a single frame. The state of the application elements is maintained to support user update and the linkage of element views to highlight image object characteristics. The multi-level application elements can be saved independently and in multiple logical configurations to support flexible saving and file sharing. Processing recipes can use the same interface of this invention, providing a standardized user experience including element loading and saving with multi-level abstraction. The invention can also handle time-lapse and 3D (z axis) image recognition applications.

The primary objective of the invention is to provide a generic human computer interface that maintains, manages and visualizes image recognition application elements and no knowledge of database structure and database query method are required for users. The second objective is to make the interface intuitive and easy to use by organizing and making all the elements visible and accessible through the interface. The third objective is to make the interface easy to configure so that the element arrangement is more meaningful for individual applications. The fourth objective is to provide context dependent processing options alongside the application elements. The fifth objective is to provide support for high volume applications with many images using the same interface of the invention. The sixth objective of the invention is to maintain and visualize the relationships between elements which form the basis of application concepts such as objects and classes. The seventh objective is to present a consistent application state in a transparent manner. The eighth objective is to provide a data structure and storage for a complete application. The ninth objective is to facilitate broadly sharing of the data and recipe. The tenth objective is to have consistent representation for both application elements and application processing recipes.

SUMMARY OF THE INVENTION

A Recognition Frame presents multi-level application elements to the user simultaneously through a computer graphical user interface. The interface consists of an image display panel for displaying image channels; a data display panel for displaying object measurements and summary statistics; a configuration display panel for displaying recipe content; a master tab for selecting the panels. It also consists of a processing toolbar for context dependent processing tool display. The Recognition Frame further comprises a second side frame for data object display and charting. The second side frame has a tabular arrangement consisting of properties tab, controls tab, and charts tab. The Recognition Frame links application elements through a complex data model wherein interface display is automatically updated when one element is changed.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which.

DETAILED DESCRIPTION OF THE INVENTION

I. Application Scenario

Figure 1:
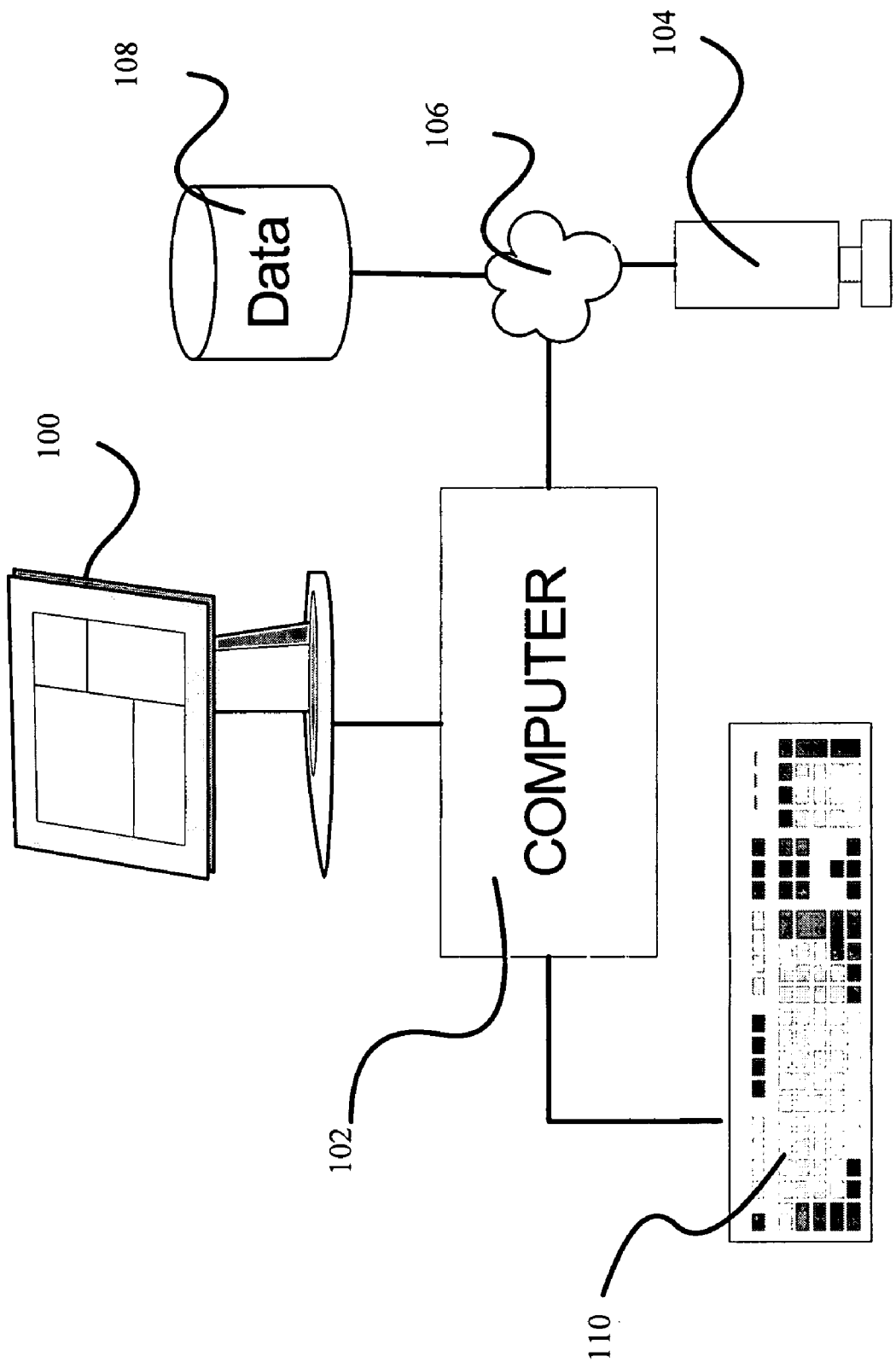
FIG. 1 shows an application scenario of the Recognition Frame user interface for image recognition applications.

Referring to FIG. 1, an application scenario of the Recognition Frame user interface for image recognition applications includes a computer monitor 100 that is connected to a computer 102. The computer is connected directly or indirectly to image sensor such as camera 104. The camera 104 transmits images to the computer 102 either directly through an attached wire or wireless link, or indirectly across a network 106, through the internet or via some other data transfer method. The camera 104 could be attached to a microscope, be embedded in piece of industrial manufacturing inspection equipment, a military platform, etc. Images can also be transferred to the computer from a data storage 108 connected directly to the computer 102, or indirectly across a network 106 or some other transfer method. The image recognition application images are transferred to the computer 102 for image recognition processing and user interaction through the interface using one or a plurality of Recognition Frame(s). Also connected to the computer is a user input device 110 such as a keyboard and mouse that can be used to facilitate the human-computer interaction through the Recognition Frame user interface.

I.A. Use Cases

Figure 2:
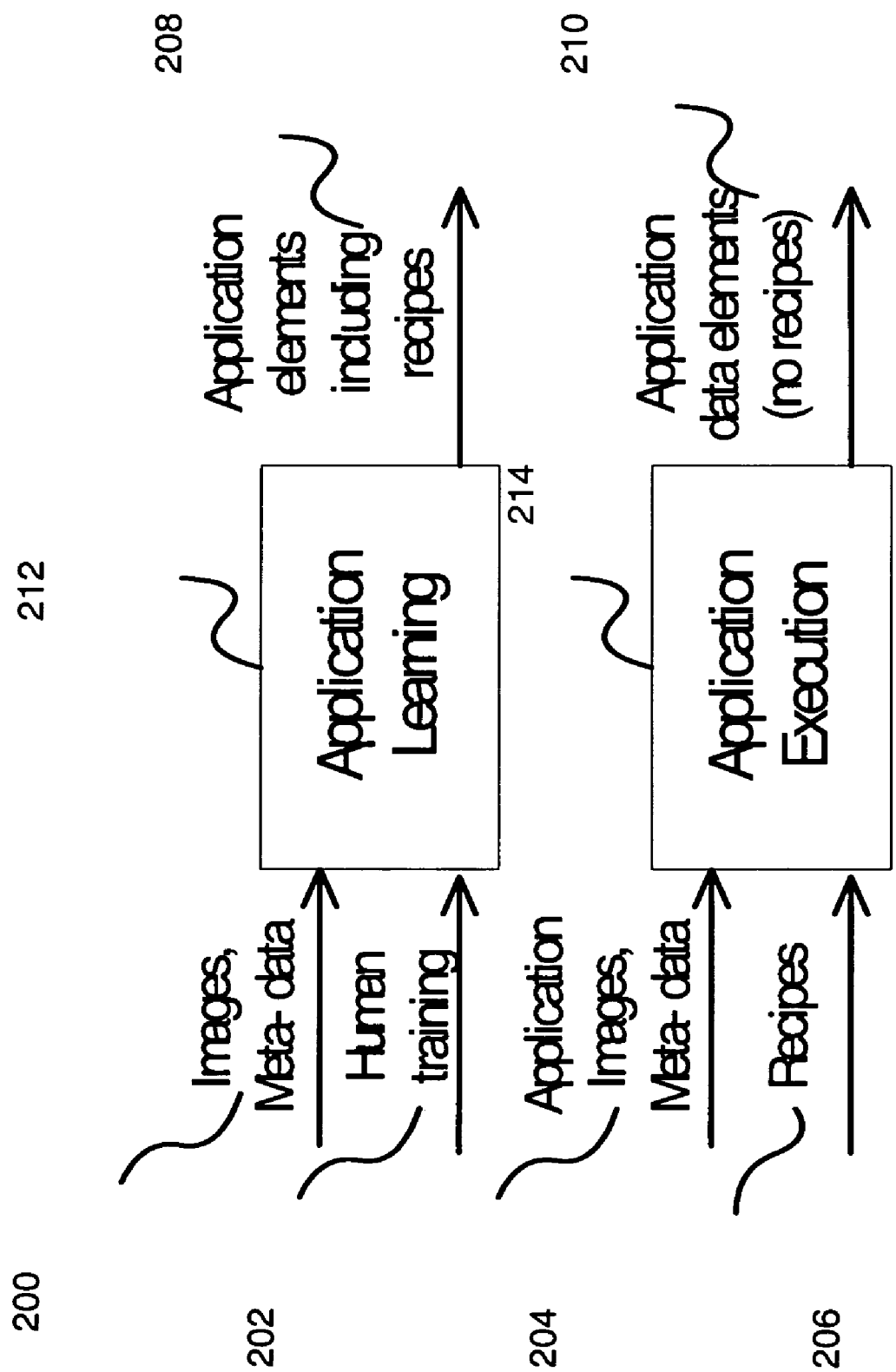
FIG. 2 shows the inputs and outputs of the two primary use cases for image recognition software tools: application learning and application execution.

FIG. 2 shows the inputs and outputs of the two primary use cases for image recognition software tools; application learning 212 and application execution 214. In one embodiment of the invention, the application learning corresponds to image recognition application development and optimization, and application execution corresponds to deployment of the image recognition application in the field. This invention assists end users to perform both use cases.

In application learning, the user works interactively with the input image(s) 200 and image recognition software tools through the interface to create application elements, including recipes 208. The primary goal is to create robust processing recipes. The user provides training 202 to the learning algorithms to produce the recipes. The other application elements are created to assist the human with training (e.g. to evaluate intermediate results). In application execution, the input recipes 206 are applied to the application images 204 by the software for automated or semi-automatic image recognition execution. The primary goal is to create results consisting of data elements 210. The results are available for human review through the interface after processing.

I.A.i Application Learning

Figure 3:
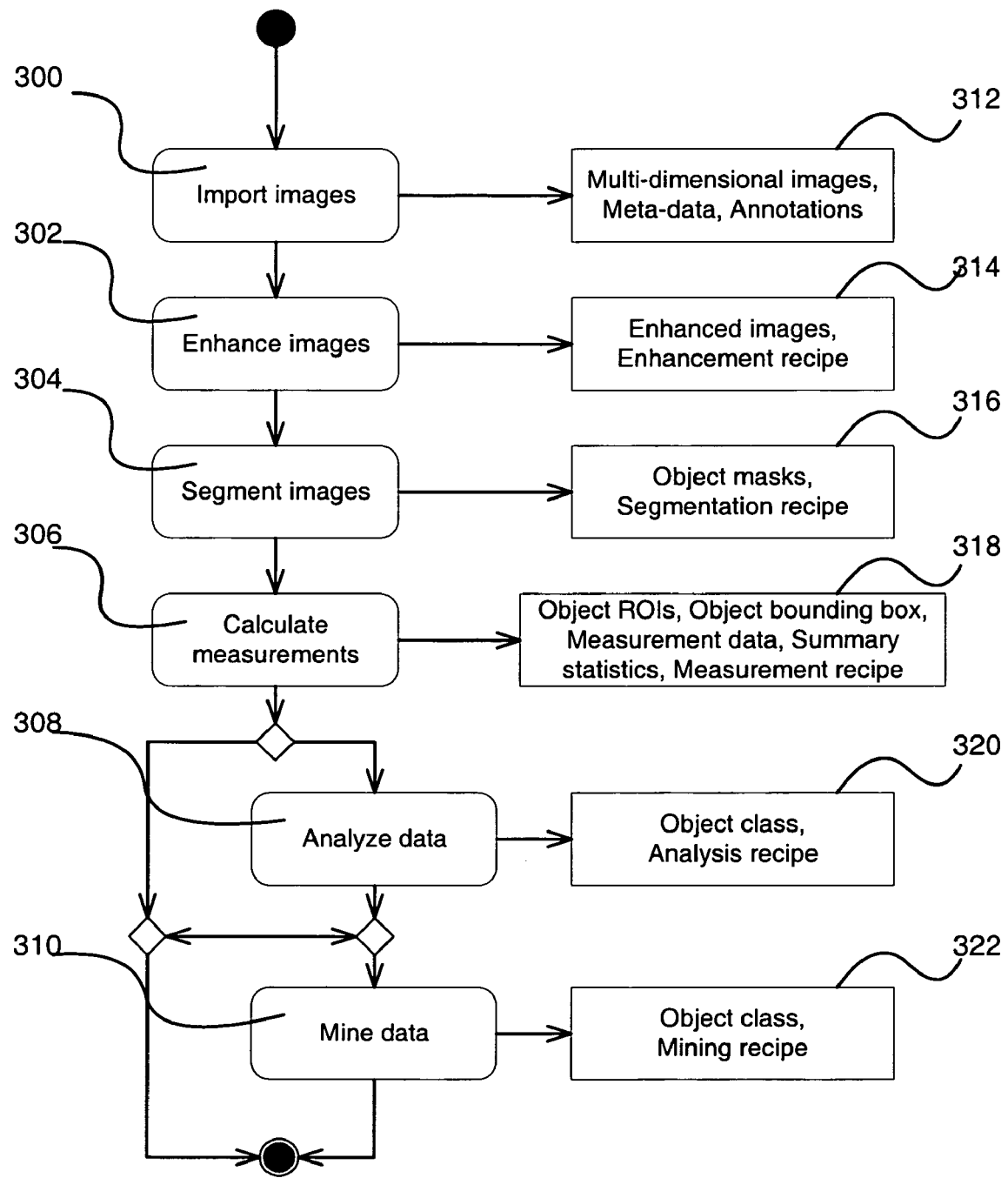
FIG. 3 presents the activities performed and application elements created in the application learning use case workflow.

FIG. 3 presents the activities performed (in ovals) and application elements created (in rectangles) in the application learning use case workflow. In the import images activity 300, the user imports image(s) into the software to use for training. The images may be multi-dimensional (Andrews PD, Harper I S, Swedlow J R. 2002. To 5D and beyond: quantitative fluorescence microscopy in the postgenomic era. Traffic. January; 3(1):29-36) and contain multiple channels, positional relations, and extend along a temporal (animation) or z (multiple focal plans) axis. The images may contain metadata, including descriptions of its multi-dimensionality, information about the image acquisition system, experimental setting, materials, etc. The user may add additional information to the meta-data. The user may also make annotations in the images. After the import images 300 activity, its application elements is brought into or created in the software include one or more multi-dimensional images, image meta-data and image annotations 312.

Next in the enhance image activity 302, the user prepares one or more images for image segmentation by applying image enhancement functions and filters (e.g. alignment functions, morphological functions, etc.) to the images. Alternatively the user can apply these functions and filters indirectly through computer assisted methods similar to those disclosed in (Lee S J, Oh S, 2005. Method of directed pattern enhancement for flexible recognition. U.S. patent application Ser. No. 11/301,292; filed December 7) that do not require the user to have image processing expertise. The user's choices and training are encoded into an enhancement recipe that can be automatically applied to additional images from the same application. After the enhance image(s) activity is complete, additional application elements 314 may include the enhanced images and the enhancement recipe.

Next, in the segment image(s) activity 304, the user applies image processing functions that result in the assignment of image pixels to binary object masks that divide the image into foreground (object) and background regions. Note that for images with a temporal and z (or focus) extent, additional processing must be done to link or "track" the objects across image frames. Alternatively the user can accomplish this task indirectly through computer assisted methods that require no image processing expertise. The user's choices and training are encoded into a segmentation recipe that can automatically be applied to additional images from the same application. After the segment image(s) activity is complete, additional application elements 316 may include the object masks and the segmentation recipe.

In the calculate measurements activity 306, the user may create derived masks through binary mask operations, label objects by applying connected component labeling functions, create other derived images such as distance transform images to facilitate measurements, and then apply measurement functions to the input image(s), object masks and derived images to calculate object and image measurements. Note that the objects likely have similar dimensionality as the images. Thus if the image has channel, temporal and z dimensions, object labeling must also be done in these dimensions. Thus the object concept is a collection or set of 2D masks associated across image channels, time frames and z slices. Once raw measurements have been calculated, additional measurements can be derived from them, as well as object measurement statistics. A set of 2D object bounding boxes can be determined for each multi-dimensional object mask set (useful for object image montage presentation), and a multi-dimensional vector representation of the object mask (Object Region of Interest (ROI)) can also be calculated and displayed using a technology such as scalable vector graphics to enable a convenient presentation amenable to user modification. The above can be accomplished by the end user directly or indirectly with the aid of computer assisted methods that do not require the user to understand binary mask operations or complex measurement derivations, and make it easy to choose and calculate effective measurements for their application of interest. The user's choices and training are encoded into a measurement recipe that can automatically be applied to additional images from the same application. At the conclusion of the calculate measurements activity, additional application elements 318 may include object bounding box, object ROIs, measurement data, summary statistics and the measurement recipe.

In the analyze data activity 308, the user reviews the measurement data and statistics in charts and tables. The user may create object subsets by applying gates. Gates are logical regions drawn in the measurement charts, objects whose measurements fall within the gate region are included in the subset. A subset membership can be thought of as an object class. User actions and gates are encoded into an analysis recipe that can automatically be applied to additional images from the same application to create classes. Not all image recognition applications require the creation of classes. Some applications may conclude with the production of measurements and statistics. At the conclusion of the analyze data activity, additional application elements 320 may include object class labels and the analysis recipe.

In the mine data (or decision making) activity 310, the user applies machine learning and data mining techniques with computer assistance to the measurement and statistics to create object classes. User choices and training are encoded into a mining recipe that can automatically be applied to additional images from the same application to create classes. Not all image recognition applications require the application of these techniques. It may be sufficient to create simple gates in the analyze data activity to create classes, or the application may not require the creation of classes. At the conclusion of the mine data activity, additional application elements 322 may include object class labels and the mining recipe.

1.A.i Application Execution

Figure 4:
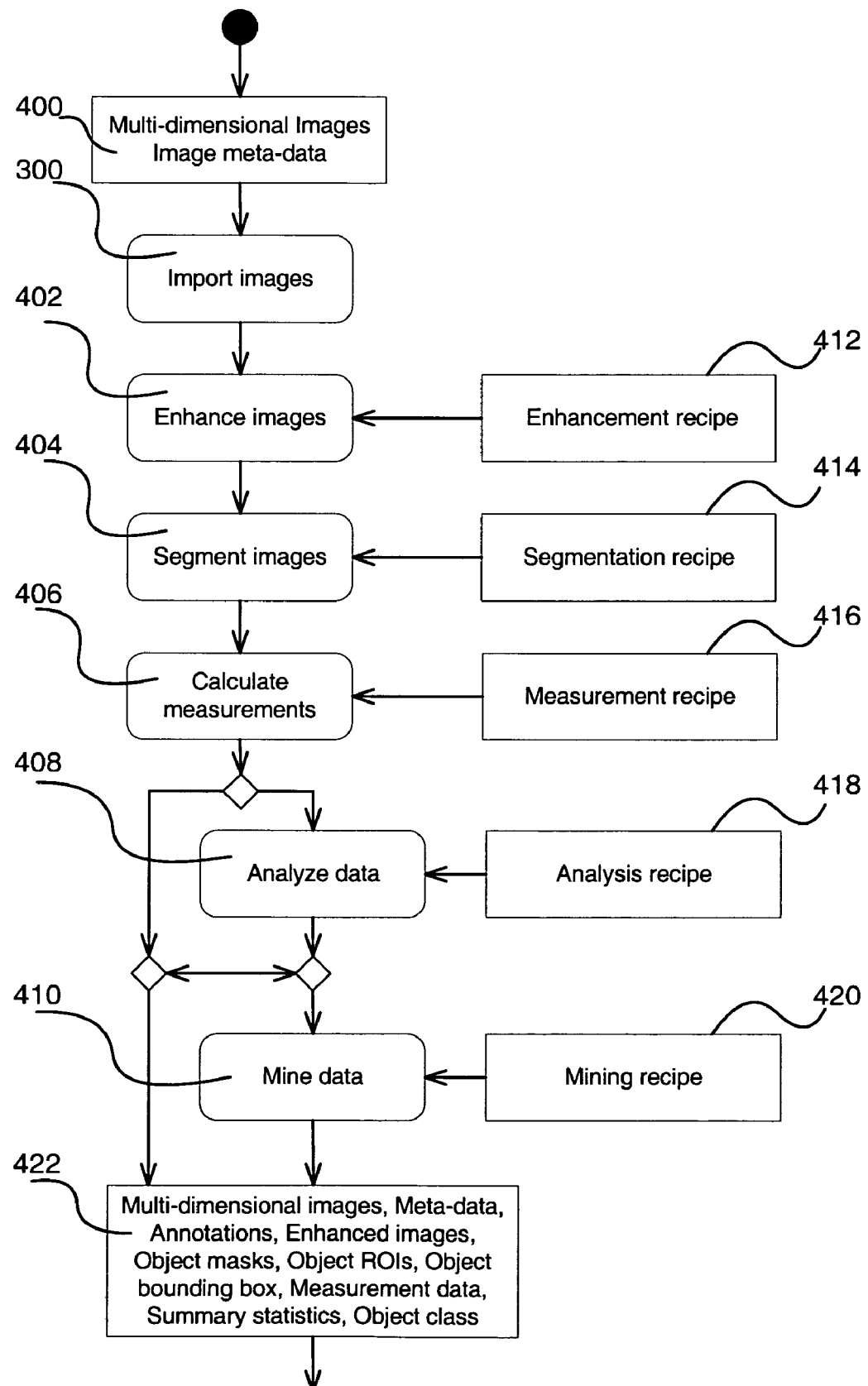
FIG. 4 presents the activities performed and application elements utilized and created in the generic application execution use case workflow.

FIG. 4 presents the activities performed (in ovals) and application elements (in rectangles) utilized and created in the generic application execution use case workflow. In application execution, activities are performed automatically on the input images 400 using the recipes created in application learning. In the figure, the workflow is shown as automated serial execution of the activities with application data (non recipe) element review at the end. Those having ordinary skill in the art should recognize that in practice each activity could be automatically performed individually, and the data elements produced by that activity reviewed immediately after its execution.

In the application execution use case, multi-dimensional images and associated meta-data 400 are imported 300. This step could be done manually or programmatically. Next the images are automatically or semi-automatically enhanced 402 using the encoded procedures in the Enhancement recipe 412 that may include interactive component. Next the images are segmented 404 using the segmentation recipe 414. Then measurements are calculated 406 using the measurement recipe 416. This is the last step for some applications, but for others object classes may be produced in the analyze data activity 408 using the analysis recipe 418. Additional classes may also be produced in the mine data activity 410 using the mining recipe (sometimes called decision recipe) 420.

Application data elements 422 may include multi-dimensional images, and may also include image meta-data, image annotations, enhanced images, object masks, object ROIs, object bounding boxes, measurement data, summary statistics and object class association. Application recipe elements may include recipes for enhancement, segmentation, measurement, analysis and mining.

1.B. The Recognition Frame

Figure 5:
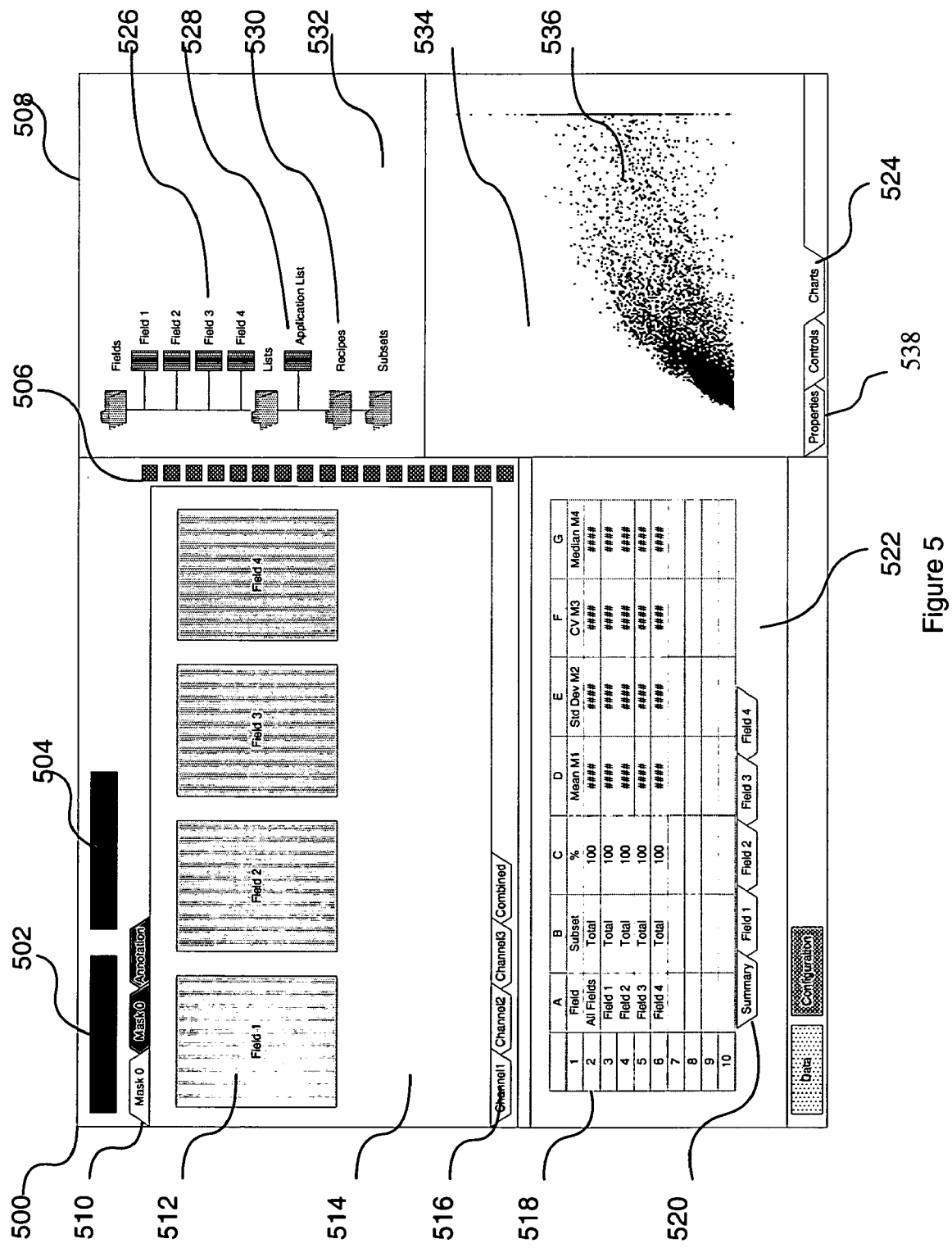
FIG. 5 shows the recognition frame presenting multi-level application elements to the user simultaneously through a single interface.

In a particularly preferred, yet not limiting embodiment, the present invention, shown in FIG. 5, presents all these multi-level application elements to the user simultaneously through a single interface. In this preferred yet not limiting embodiment, the Recognition Frame consists of a first side frame 500 containing an image display panel 514 and a data display panel 522, and a second side frame 508 containing areas for data object display 532 and charting, controls and meta-data display 534. In another embodiment, the Recognition Frame could be a combination of the entire second side frame 532, or just the charting, controls and meta-data portion 534. In this embodiment the Field data object 526 represents a container for application data elements, each Field containing a single multi-dimensional image and its associated data elements.

The Recognition Frame provides an interface for Fields 526, Lists 528 and Recipes 530. It provides a single interface through which to create, manage, process, modify and visualize the Field data and Recipe elements 530. Lists 528 are simply collections of Fields that are subject to identical processing through associated Recipes applied through the Recognition Frame.

1.C Application Element Presentation

The key components of the Recognition Frame 500 include the image display panel 514, the data display panel 522, the charting, controls and meta-data panel 534, and the processing toolbar 506. All application elements are present in the interface.

1.C.i Multi-Dimensional Image Display

The multi-dimensional images 512 are displayed in the image display panel 514. Individual image channels can be viewed by selecting the channel tabs 516. When the user clicks on a particular channel tab, all of the images 512 are updated to show the image frame from that channel. There is also a combined channel display tab which displays a user defined visualization mapping of the individual channels. Enhanced images are associated with individual channels and can be displayed in the image display panel 514 by right-clicking on the appropriate channel tab 516 or other means that notifies the image display panel to switch the display to the enhanced image. The image may include additional axes such as temporal, z, and positional. In the default view each axis can be navigated using navigation controls 504 which drive the image display 512. For example, when navigating through time each image display 512 is updated with the image frame corresponding to the navigation control time point. Similarly, multiple positions can be linked to a single Field along the positional dimension (e.g. multiple images from a well plate or slide). Navigating through positions will display the current image frame on the image display 512 that corresponds to the positional readout in the navigation control 504. There are many possible views of multi-dimensional fields in the image display panel 514. Multi-channel frames of the image can be displayed side by side arranged a long a particular axis (time, z, or position). 3D object renderings can be displayed here as well. Derived image frames such as (x,t), (y,t), (x,z), (y,z) can be shown. Many such common and innovative multi-dimensional image viewing methods can be used here. Zoom controls 502 allow the user to magnify the image by increasing the number of image pixels shown per monitor display pixel. Binary mask controls 510 allow the overlay of object masks onto the display images 512. Multiple masks can be separately colored, transparency manipulated and overlaid via the control 510. Object ROIs can also be displayed overlain on the images 512 and differentially colored. When selected, object ROIs change color to indicate selection. Image annotations can also be made and associated with individual image frames by adding an annotation mask via the mask controller 510.

1.C.ii Image Display Modes

Figure 6B:
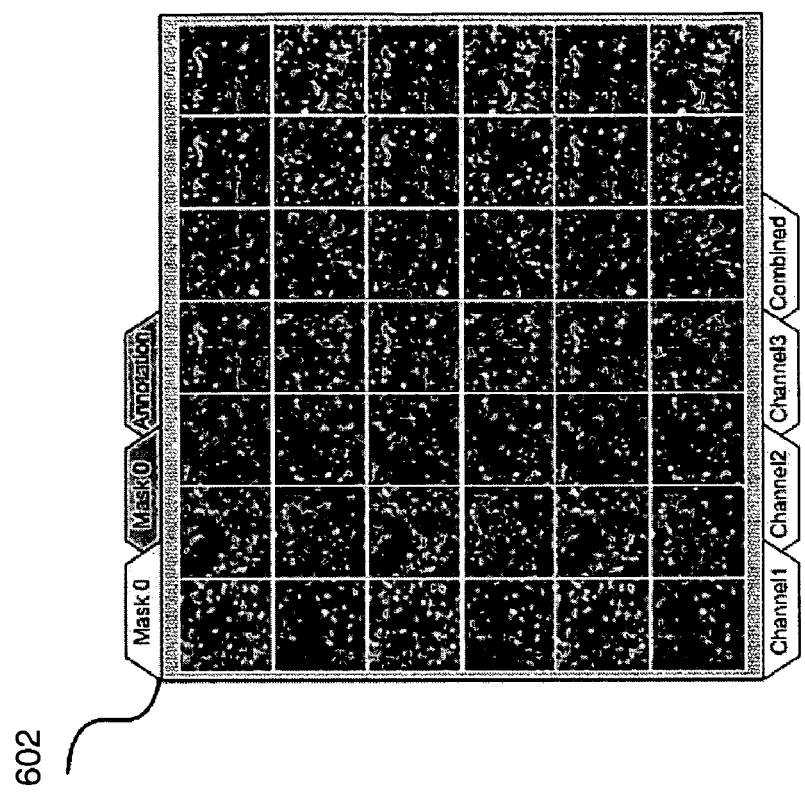
FIG. 6B shows an instance of the image display panel in the whole image thumbnail display mode.
Figure 6A:
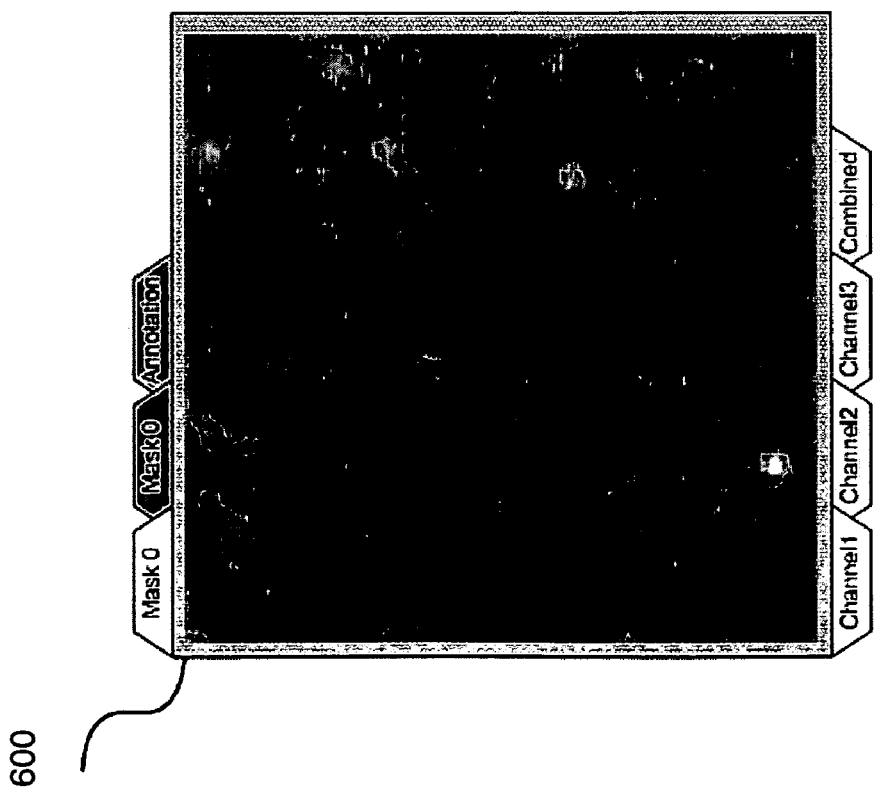
FIG. 6A shows an instance of the image display panel in the whole image display mode.
Figure 6C:
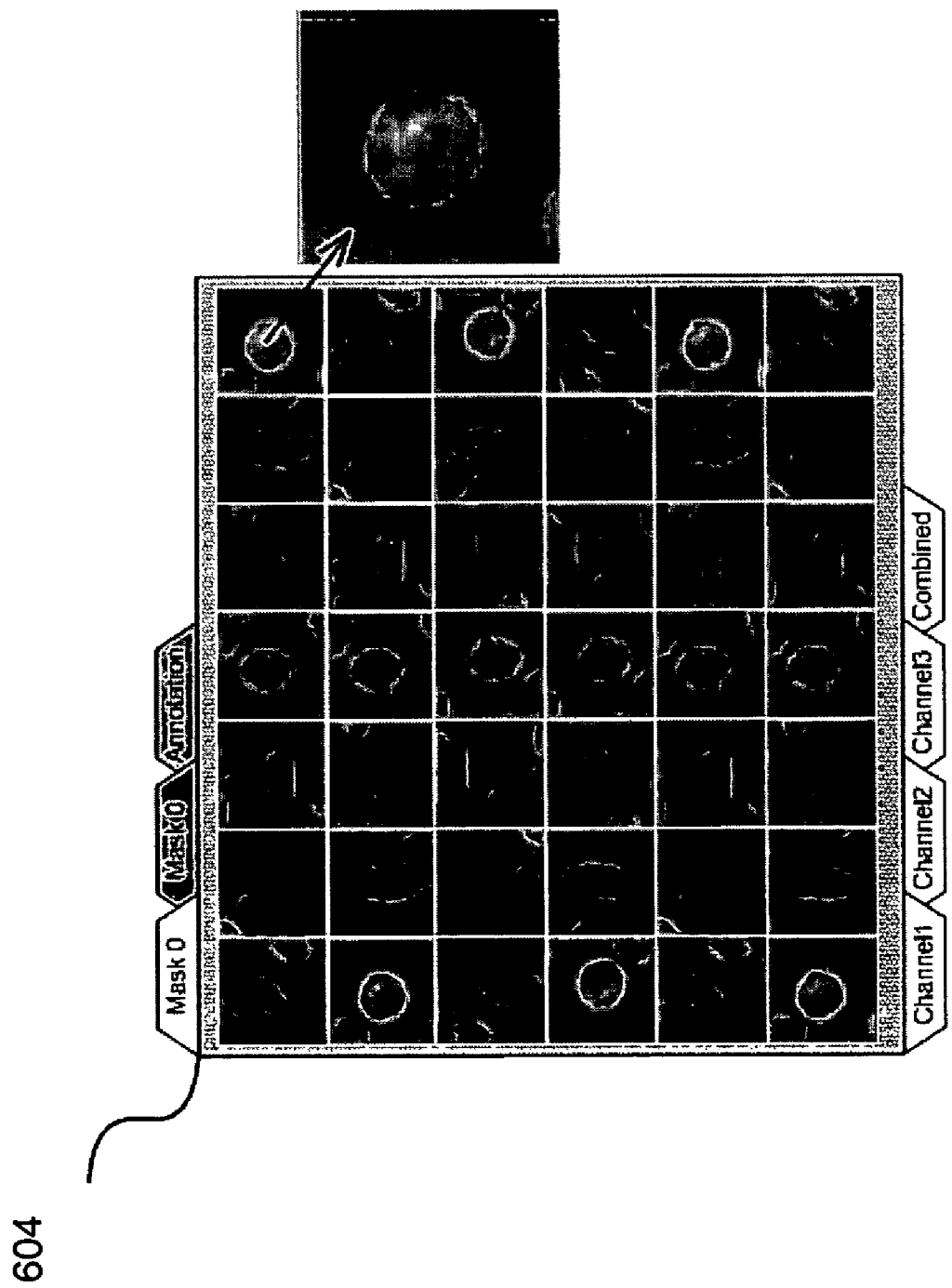
FIG. 6C shows an instance of the image display panel in the image montage display mode.

FIGS. 6A, 6B, and 6C shows three instances of the image display panel 514 of FIG. 5 containing the three primary image display modes of the preferred embodiment; whole image display 600, whole image thumbnail display 602, and image montage display 604. Whole image display as shown in FIG. 6A is the default display mode. If the user zooms out using the zoom controls 502 and there are multiple Fields in the List, the multiple whole images are displayed side by side as thumbnails as shown in the whole image thumbnail display 602. The size of the thumbnail and the number of thumbnails displays depends on the zoom level. After measurements have been calculated, the user can switch to montage mode 604. Here the thumbnails correspond not to whole images, but to individual objects. The object bounding box Field element is used to determine the size of the thumbnail display. All of the image display functionality is supported for all three views.

1.C.iii Field Arrangement and Data Overlay

Basic multi-dimensional image arrangement functionality are referred to as "stack" operations because the linear arrangement of image frames along each axis can be thought of as a stack of images. Arrangement functions allow users to extract all or portions of stacks and merge them along any axis. This invention allows merging and extracting stacks from Fields, including not only the images but also the associated application elements.

Figure 7A:
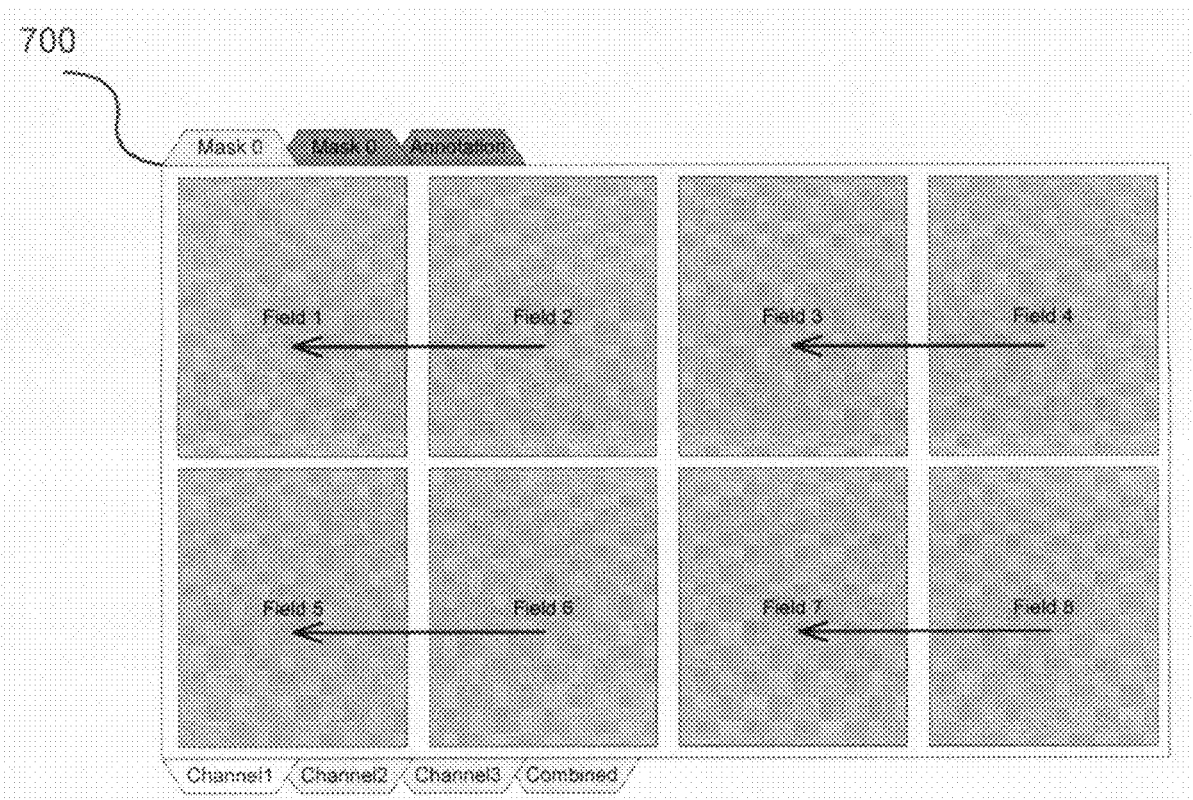
FIG. 7 illustrates an example where a user wishes to combine and rename several Fields.
Figure 7B:
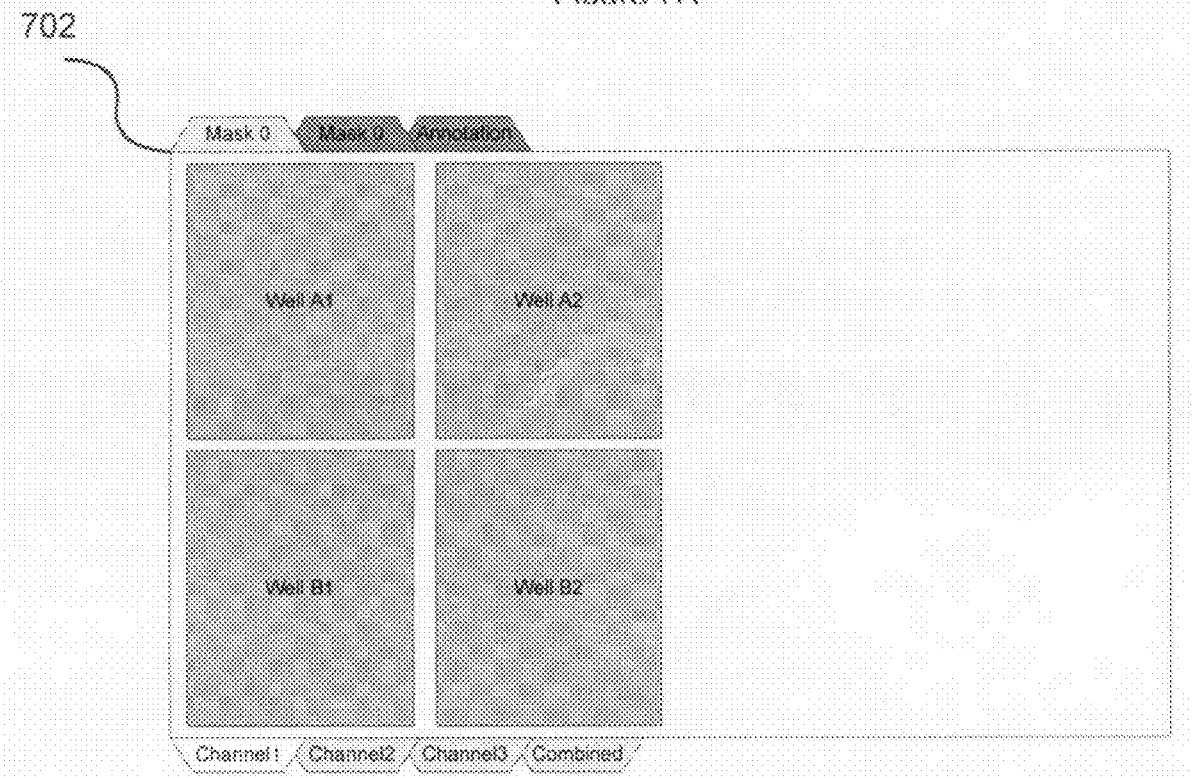

Entire Fields can also be merged. FIGS. 7A and 7B shows the image display panel 514 of F*igure* 5. 700 illustrates an example where a user wishes to combine and rename several Fields. Here Field 2 should be combined with Field 1, Field 4 with Field 3, Field 6 with Field 5, and Field 8 with Field 7. The new field will contain both Fields, with each Field's multi-dimensional images aligned along the positional axis. Other Field elements will be accumulated. For example, Field 2 measurements will be added to Field 1's measurements, and the measurement statistics updated.

There are many applications where this functionality is useful. For example, the Fields may come from the same well on a well plate. 702 shows the result of this Field merging and positional rearrangement. The user has merged the four Fields into two combined Fields and renamed them Wells. The user has arranged the Wells into 2 rows corresponding to their actual position on an external well plate.

The data overlay functionality simply overlays a color corresponding to the value of a user selected statistic for the Field. It is available for all three image modes. The ability to merge and arrange Fields, coupled with data overlay enables a user to easily configure the display so that it is meaningful for their application of interest.

1.C.iv Other Element Presentation

Referring again to FIG. 5, image and application Meta-data is displayed in the charting, controls and meta-data panel 534 by selecting the Properties tab 538. After measurements calculation, summary statistics and object data are presented in table form in the data display panel 522. In a preferred embodiment, data display is done in a spreadsheet 518. The spreadsheet has a tabular arrangement 520 allowing for separate data presentation. The summary tab shows image measurements and object measurement statistics for all Fields and subsets contained in the Recognition Frame. Subsequent tabs contain individual object measurements for each Field and Subset. Common spreadsheet functions such as formulae calculations, addition/deletion of rows, sorting etc. can be performed. Object measurements for all objects, Field objects, Subset objects, or user selected objects can be presented in the charting window. Charting types include histogram, dot plot, stacked plot, box n whiskers plot, etc. Charting elements, such as dot plot dots 536 which represent individual objects, change color when selected via mouse click or region based selection.

1.D Application Element Access and Processing

In addition to presenting application elements, the Recognition Frame makes the elements accessible for recognition processing. The processing toolbar 506 of FIG. 5 provides context dependent recognition processing options. For example, if the Field(s) have no masks, then only image enhancement and image segmentation functionality is available. After masks have been produced, measurement functionality becomes available on the toolbar. After measurements have been calculated tools for analyzing and mining data become available. For example, object ROIs can also be edited using tools located on toolbar which become available after measurements have been calculated and ROIs created. If processing recipes have been associated to the Field(s) then icons for executing those processing recipes are also accessed via the processing toolbar.

I.E. Application State Maintenance

The Recognition Frame interface of this invention manages the state display for the application elements. All of the application elements are linked through a complex data model. When one element is changed the interface display can be automatically updated. For example, if a user modifies an object ROI, or if a single channel of a Field's multi-dimensional image is re-segmented with a new segmentation recipe, all the relevant elements are updated and available for display. These would include new masks, new object ROIs and bounding boxes, updated measurements and statistics, and object class associations.

The interface also listens for element selection through any of its presentations, and will enable selected in all other views currently displayed. For example, if a user selects a collection of objects in one of the chart views they are highlighted on the chart by changing color and/or increasing in display intensity. These objects are similarly highlighted in the other primary interfaces such as the object ROI overlays on images or montage, and in the spreadsheet.

I.F. Recognition Frame Input/Output

The Recognition Frame supports multi-level saving. The entire Recognition Frame containing all Field elements including recipes can be saved to a single file. Alternatively individual elements or any combination of elements can also be saved. For example, enhanced images, masks, scalable vector graphic object representations can all be saved individually or together. The data can be saved all together, or only individual Field or Subset (class) data can be saved. All combinations can be supported.

This invention is different from many similarly sophisticated tools because it does not require a database to initialize.

The user can get started with just a few images, and the generic relationships between application elements are established and maintained by the software as they are created. However this does not preclude the interface from linking to external databases through a suitable interface for the import and export of application elements.

I.G. Recognition Frame for Recipes

Figure 8:
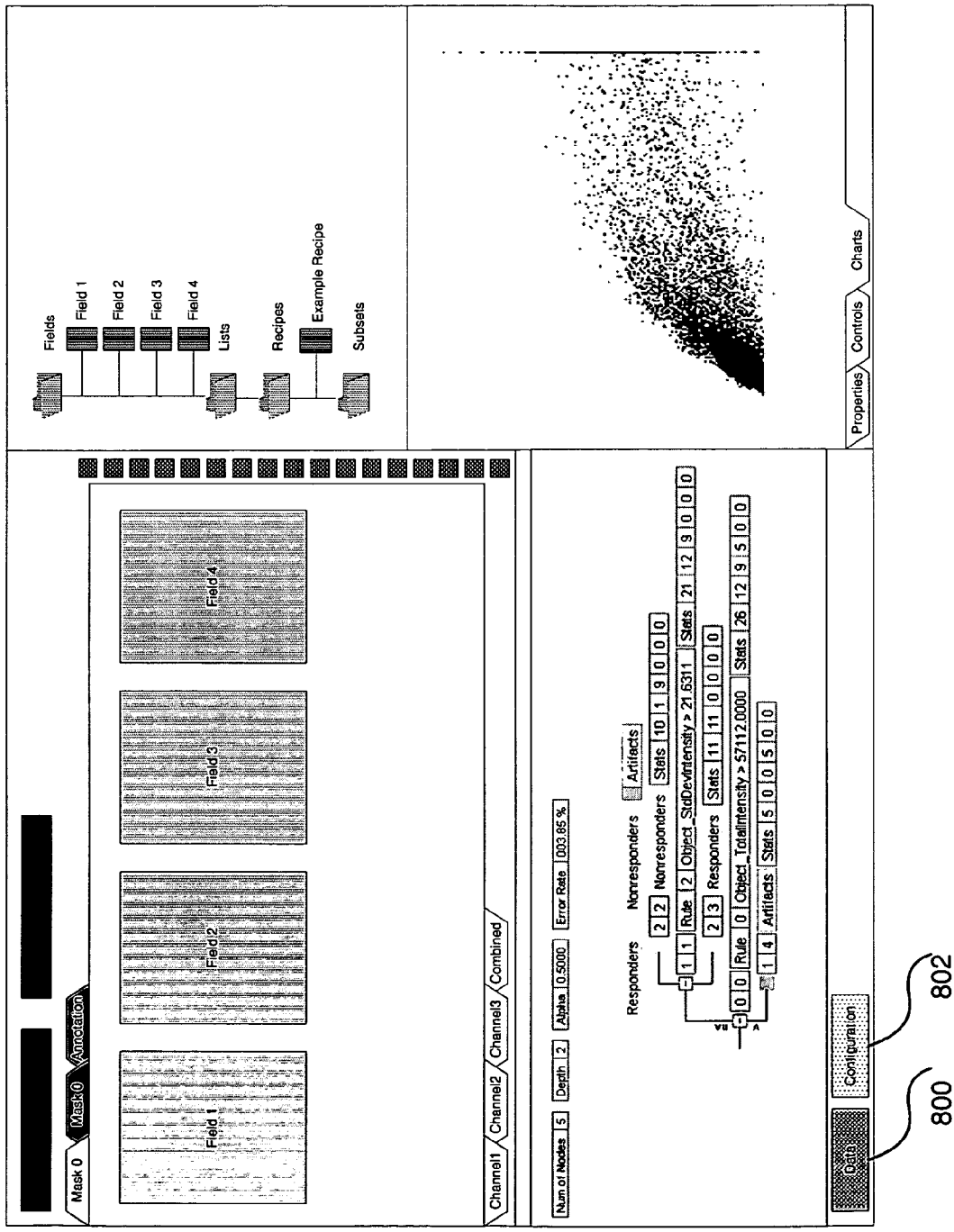
FIG. 8 shows the recognition frame containing an example recipe.

The Recognition Frame is the singular, generic interface for image recognition applications. As such, it supports both Field and Recipe data objects. FIG. 8 shows the Recognition Frame containing an example recipe. When the user clicks on the configuration tab 602 the Recipe configuration logic is shown in the data display panel. Here a classification tree, as disclosed in (Lee S J 2004. Dynamic learning and knowledge representation for data mining. United States Patent Application No. 20040267770; December 30) is displayed as an example of a Mine Recipe configuration. The images in the image display panel are the images used to train the recipe. If the user clicked on the Data tab 800, the spreadsheet display 520 from FIG. 5 would appear, and the data would correspond to the object data used to train the tree in this recipe. Similarly the charted data in the charting display 524 from FIG. 5 corresponds to object data used to train the tree. All of the application elements associated with this Recognition Frame belong to the recipe. All of the benefits of the Recognition Frame disclosed above are available for use with Recipes, just as they are for Fields.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A computer imaging system that processes images and displays a Recognition Frame comprising:
   multi-level application elements that are simultaneously displayed through a single computer graphical user interface;
   an image display panel for displaying image channels;
   a data display panel for displaying object measurements and summary statistics;
   configuration display panel for displaying recipe content;
   a master tab for selecting the image display panel, the data display panel, and the configuration display panel; and
   a processing toolbar for context dependent processing tool display;
   wherein a user provides training to learning algorithms to produce recipes.

2. The Recognition Frame of claim 1 further comprises a second side frame for data object display and charting.

3. The Recognition Frame of claim 1 wherein the image display panel contains
   a channel tabs all images are updated to show image frame from the tab selected channel; and
   Binary mask controls allow the overlay of object masks onto the display images.

4. The Recognition Frame of claim 1 wherein the image display panel displays image under a mode selected from the group consisting of whole image display, whole image thumbnail display, and image montage display.

5. The Recognition Frame of claim 1 wherein the data display panel has a tabular arrangement allowing for separate data presentation comprising:
   a summary tab shows image measurements and object measurement statistics for Fields and subsets; and
   at least one tab contains individual object measurements for Field and Subset.

6. The Recognition Frame of claim 1 wherein the processing toolbar makes the recognition processing accessible for processing wherein recognition processing is selected from a group consisting of enhance images, segment images, calculate measurements, analyze data, and mine data.

7. The Recognition Frame of claim 2 wherein the second side frame has a tabular arrangement consisting of properties tab, controls tab, and charts tab.

8. The Recognition Frame of claim 1 links application elements through a complex data model wherein interface display is automatically updated when one element is changed.

9. The Recognition Frame of claim 1 supports both Field and Recipe data objects.

10. The Recognition Frame of claim 9 wherein the entire Recognition Frame containing all Field elements including recipes can be saved to a single file.

11. A computer imaging system that processes images and displays a Recognition Frame comprising:
   multi-level application elements that are simultaneously displayed through a single computer graphical user interface;
   an image display panel for displaying an image channel;
   a data display panel for displaying object measurements;
   configuration display panel for displaying recipe content;
   charting, controls and meta-data panel for data object display and charting;
   a master tab for selecting the image display panel, the data display panel, the configuration display panel, and the charting, controls and meta-data panel; and
   a processing toolbar for context dependent processing tool display;
   wherein a user provides training to learning algorithms to produce recipes.

12. The Recognition Frame of claim 11 links application elements through a complex data model wherein interface display is automatically updated when one element is changed.

13. The Recognition Frame of claim 11 supports both Field and Recipe data objects.

14. The Recognition Frame of claim 13 wherein the entire Recognition Frame containing all Field elements including recipes can be saved to a single file.

15. A computer imaging system that processes images and displays a Recognition Frame comprising:
   multi-level application elements that are simultaneously displayed through a single computer graphical user interface;
   an image display panel for displaying an image;
   a data display panel for displaying object measurements;
   a master tab for selecting the image display panel and the data display panel; and
   a processing toolbar for context dependent processing tool display;
   wherein a user provides training to learning algorithms to produce recipes.

16. The Recognition Frame of claim 15 further comprises a configuration display panel for displaying recipe content.

17. The Recognition Frame of claim 15 further comprises a second side frame for data object display and charting.

18. The Recognition Frame of claim 15 wherein the image display panel contains
   channel tabs wherein all images are updated to show image frame from the tab selected channel; and
   Binary mask controls allow the overlay of object masks onto the display images.

19. The Recognition Frame of claim 15 wherein the image display panel displays image under a mode selected from the group consisting of whole image display, whole image thumbnail display, and image montage display.

20. The Recognition Frame of claim 15 wherein the data display panel has a tabular arrangement allowing for separate data presentation comprising
   a summary tab shows image measurements and object measurement statistics for Field and subset; and
   at least one tab contain individual object measurements for Field and Subset.

* * * * *